(12) United States Patent
Noda et al.

(10) Patent No.: US 8,578,286 B2
(45) Date of Patent: Nov. 5, 2013

(54) INFORMATION PROCESSING DEVICE, INFORMATION PROCESSING METHOD, AND PROGRAM

(75) Inventors: Takuro Noda, Tokyo (JP); Yasushi Okumura, Tokyo (JP)

(73) Assignee: Sony Corporation, Tokyo (JP)

(*) Notice: Subject to any disclaimer, the term of this patent is extended or adjusted under 35 U.S.C. 154(b) by 112 days.

(21) Appl. No.: 13/160,939

(22) Filed: Jun. 15, 2011

(65) Prior Publication Data

US 2012/0011456 A1    Jan. 12, 2012

(30) Foreign Application Priority Data

Jul. 7, 2010  (JP) ................................ P2010-155115

(51) Int. Cl.
*G06F 3/048*  (2013.01)

(52) U.S. Cl.
USPC ........... 715/769; 715/719; 715/764; 715/771; 715/772; 715/773; 715/794; 715/847

(58) Field of Classification Search
USPC .......... 715/719, 764, 769, 771–773, 794, 847
See application file for complete search history.

(56) References Cited

U.S. PATENT DOCUMENTS

| | | | |
|---|---|---|---|
| 6,229,456 B1* | 5/2001 | Engholm et al. | 341/35 |
| 7,024,677 B1* | 4/2006 | Snyder et al. | 725/86 |
| 7,161,618 B1* | 1/2007 | Niikawa et al. | 348/207.1 |
| 2001/0015757 A1 | 8/2001 | Saito | |
| 2004/0008263 A1* | 1/2004 | Sayers et al. | 348/207.11 |
| 2004/0061788 A1 | 4/2004 | Bateman | |
| 2004/0225416 A1* | 11/2004 | Kubota et al. | 701/1 |
| 2006/0072028 A1* | 4/2006 | Hong | 348/333.01 |
| 2007/0078601 A1* | 4/2007 | Nakano et al. | 701/301 |
| 2007/0273848 A1* | 11/2007 | Fan et al. | 353/119 |
| 2008/0051642 A1* | 2/2008 | Krupnik | 600/302 |
| 2008/0204402 A1* | 8/2008 | Hirata et al. | 345/156 |
| 2009/0187121 A1* | 7/2009 | Evans | 600/595 |
| 2009/0247233 A1* | 10/2009 | Kim | 455/566 |
| 2010/0026643 A1* | 2/2010 | Ozawa et al. | 345/173 |
| 2010/0271533 A1* | 10/2010 | Bogusky et al. | 348/335 |

(Continued)

FOREIGN PATENT DOCUMENTS

| | | |
|---|---|---|
| JP | 11-212726 | 8/1999 |
| JP | 2004-343653 | 12/2004 |
| JP | 2010-55598 | 3/2010 |
| WO | WO2008-030976 | 3/2008 |

OTHER PUBLICATIONS

Sep. 2, 2013, EU communication issued for related EU application No. 11171873.0.

*Primary Examiner* — Doon Chow
*Assistant Examiner* — Shourjo Dasgupta
(74) *Attorney, Agent, or Firm* — Sherr & Jiang, PLLC

(57) ABSTRACT

There is provided an information processing device including an imaging section configured to image an object, a display section configured to display at least an icon for controlling the imaging section, an operation section configured to acquire a first operation and a second operation on the icon, and a controller configured to, when the operation section has acquired the first operation, set a timer in accordance with an operation amount of the first operation and change a display of the icon on the display section in accordance with a progress of the timer, and to, when the operation section has acquired the second operation or when the timer has expired, cause the imaging section to image the object.

17 Claims, 8 Drawing Sheets

(56) References Cited

U.S. PATENT DOCUMENTS

| | | | |
|---|---|---|---|
| 2010/0327774 A1* | 12/2010 | Kerr et al. | 315/307 |
| 2011/0032373 A1* | 2/2011 | Forutanpour et al. | 348/222.1 |
| 2011/0080367 A1* | 4/2011 | Marchand et al. | 345/174 |

\* cited by examiner

INFORMATION PROCESSING DEVICE, INFORMATION PROCESSING METHOD, AND PROGRAM

BACKGROUND

The present disclosure relates to an information processing device, an information processing method, and a program. In particular, the present disclosure relates to an information processing device, an information processing method, and a program for controlling an imaging process.

Nowadays, digital cameras for recording images as digital data are widely used as one type of imaging device. Many digital cameras are equipped with displays for displaying information such as an image of an object to be shot. In addition, PCs (Personal Computers), portable terminals, and the like are commonly equipped with cameras. In such cases, information such as an image of an object to be shot by the camera or the like is displayed on the display of the PC or the like.

Thus, there have been developed technologies for improving the operability of a camera using a display as a touchscreen. For example, JP 2010-055598A discloses a technology for relating a plurality of tracing operations, which are performed on a touchscreen of a digital camera, to a plurality of imaging modes, and thereby allowing a simplified, intuitive imaging mode switch operation.

SUMMARY

When a user captures an image of himself with a camera, for example, a timer (so-called self-timer) is commonly used. However, when a timer is used on a digital camera, there is a problem in that there would be complex operations including a plurality of stages of operations such as setting a timer on a settings screen or the like and thereafter pressing a shutter button.

In addition, a camera mounted on a PC or the like is sometimes used for sending an image via a real-time communication means such as a chat. In such cases, exacting operations may be desired such as a readjustment after a timer is set or execution of an imaging process by stopping a timer before the timer expires. This makes the problem of the complex operation for using a timer even more serious.

Nevertheless, the conventional technologies have merely replaced the dial or button functions with operations on a touchscreen as described in JP 2010-055598A, and has not solved the aforementioned complexity of the timer setting operation.

In light of the foregoing, it is desirable to provide a novel and improved information processing device, information processing method, and program that can freely control an imaging process through an intuitive operation.

According to an embodiment of the present disclosure, there is provided an information processing device including an imaging section configured to image an object, a display section configured to display at least an icon for controlling the imaging section, an operating section configured to acquire a first operation and a second operation on the icon, and a controller configured to, when the operating section has acquired the first operation, set a timer in accordance with an operation amount of the first operation and change a display of the icon on the display section in accordance with a progress of the timer, and to, when the operating section has acquired the second operation or when the timer has expired, cause the imaging section to image the object.

According to the aforementioned configuration, both the setting of a timer for an imaging process and execution of the imaging process can be controlled using a single icon. Further, as the length of the set timer can be visually perceived as the amount of the operation performed on the icon, the imaging process can be freely controlled through an intuitive operation.

The icon may be a button. The first operation may be a first drag operation on the button, and the second operation may be a pressing operation on the button. The operation amount may be a distance of a movement of the button on the display section caused by the first drag operation. The controller may change a display position of the button on the display section along a direction of the first drag operation in accordance with the progress of the timer.

The controller may display a remaining time of the timer on the display section as a path of the movement of the button on the display section caused by the first drag operation.

The imaging section may capture a moving image of the object, and the controller may set a timer for a remaining time until a start of capturing the moving image and a timer for a duration time of the capturing in accordance with the distance of the movement of the button on the display section caused by the first drag operation.

The information operating section may acquire a second drag operation on the button as a third operation, the second drag operation having a direction differing from that of the first drag operation, and the controller may change a parameter set for the imaging section in accordance with a distance of a movement of the button on the display section caused by the second drag operation.

The icon may be a button. The first operation may be a first pressing operation on the button with a pressing force whose magnitude is greater than or equal to a predetermined value, and the second operation may be a second pressing operation on the button with a pressing force whose magnitude is less than the predetermined value. The operation amount may be the magnitude of the pressing force applied in the first pressing operation. The controller may change a size of the button on the display section in accordance with the progress of the timer.

The controller may display on the display section a remaining time of the timer as a difference of the size of the button before and after the first pressing operation is acquired.

The operating section may acquire a first drag operation on the button as a third operation, and the controller may change a first parameter set for the imaging section in accordance with a distance of a movement of the button on the display section caused by the first drag operation.

The operating section may acquire a second drag operation on the button as a fourth operation, the second drag operation having a direction differing from that of the first drag operation, and the controller may change a second parameter set for the imaging section in accordance with a distance of a movement of the button on the display section caused by the second drag operation.

According to another embodiment of the present disclosure, there is provided an information processing method including displaying an icon for controlling an imaging section, the imaging section being configured to image an object, acquiring a first operation and a second operation on the icon, and setting, when the first operation has been acquired, a timer in accordance with an operation amount of the first operation and changing a display of the icon in accordance with a progress of the timer, and causing, when the second operation has been acquired or when the timer has expired, the imaging section to image the object.

According to still another embodiment of the present disclosure, there is provided a program for causing a computer to execute processes of displaying an icon for controlling an imaging section, the imaging section being configured to image an object, acquiring a first operation and a second operation on the icon, and setting, when the first operation has been acquired, a timer in accordance with an operation amount of the first operation and changing a display of the icon in accordance with a progress of the timer, and causing, when the second operation has been acquired or when the timer has expired, the imaging section to image the object.

According to the embodiments of the present disclosure described above, an imaging process can be freely controlled through an intuitive operation.

DETAILED DESCRIPTION OF THE EMBODIMENTS

Figure 1:
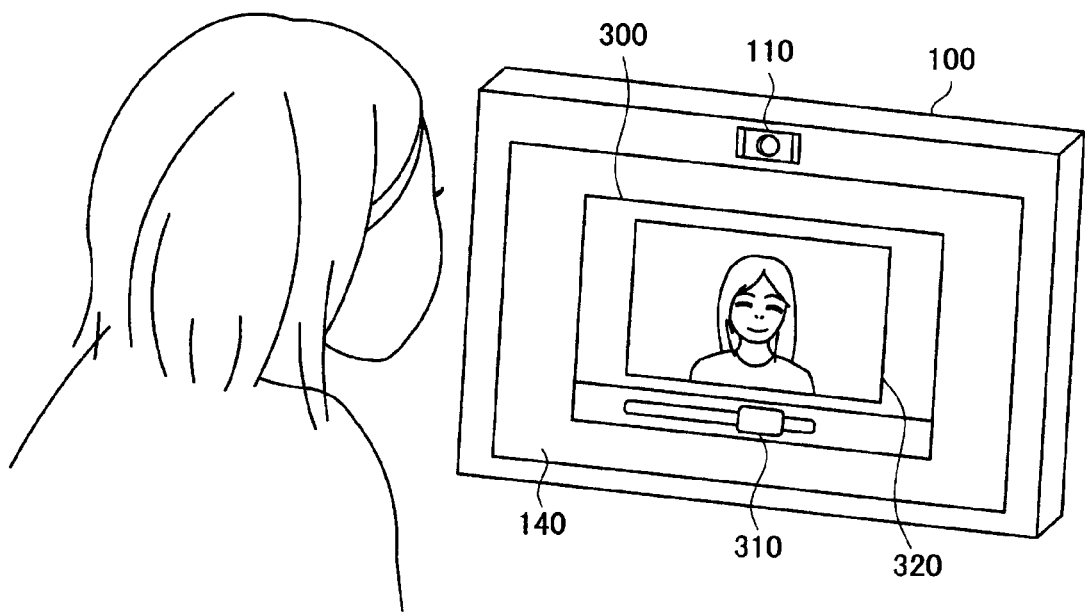
FIG. 1 is a diagram showing the appearance of an information processing device in accordance with the first embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The description will be given in the following order.
1. First Embodiment
1-1. Device Configuration
1-2. Operation on Operation Screen
2. Second Embodiment
3. Third Embodiment
3-1. Operation on Operation Screen
3-2. Process Flow
3-3. Variation
4. Fourth Embodiment
4-1. Device Configuration
4-2. Operation on Operation Screen
4-3. Variation
5. Supplement (1. First Embodiment)
First, the first embodiment of the present disclosure will be described with reference to FIGS. 1 to 4.
(1-1. Device Configuration)
FIG. 1 is a diagram showing the appearance of an information processing device 100 in accordance with the first embodiment of the present disclosure. Referring to FIG. 1, the information processing device 100 includes an imaging section 110 and a touchscreen 140.

The imaging section 110 images an object. In the example shown in the drawing, an object that is imaged by the imaging section 110 is a user. However, an object that is imaged can be a person or an object other then the user. The imaging section 110 can capture either a still image or a moving image of the object.

The touchscreen 140 displays an operation screen 300 for the user, and acquires an operation of the user on the operation screen 300. The user controls the imaging section 110 by operating the operation screen 300 via the touchscreen 140. The operation screen 300 includes a shutter button 310 and a target image 320. The details of the touchscreen 140 and the operation screen 300 are described below.

Although the information processing device 100 is shown as a photo frame-type terminal device herein, the present disclosure is not limited thereto, and thus, the information processing device 100 can be a wide variety of devices such as a PC, a portable terminal, a digital camera, or a television. Among them, examples of the PC, the portable terminal, and the digital camera are described below.

When the information processing device 100 is a PC, the PC can be of any type such as a desktop PC, a notebook-sized PC, or a tablet PC. In this case, the imaging section 110 is a camera that is built in the PC or is externally attached to the PC via a USB (Universal Serial Bus). Examples of the imaging section 110 include a so-called Web camera that images a user who is operating the PC. The touchscreen 140 is a display that is built in the PC or is externally attached to the PC via a DVI (Digital Visual Interface) or the like. However, the touchscreen 140 can be replaced with a display without a touchscreen function and a pointing device such as a mouse or a tablet. The operation screen 300 is a screen typified by application software of the PC, and is displayed on a part of or the whole of the touchscreen 140. Alternatively, the operation screen 300 can be displayed as a part of a screen that is displayed by application software including other functions such as chat software.

When the information processing device 100 is a portable terminal, examples of the portable terminal include a portable phone, a PDA (Personal Digital Assistant), and a portable game machine. In such a case, the imaging section 110 is a camera that is built in or is externally attached to the portable terminal. The touchscreen 140 is a display portion of the portable terminal. A plane on which the imaging section 110 is disposed and a plane on which the touchscreen 140 is disposed can be either the same plane or opposite planes. The operation screen 300 is a screen that is displayed by control software or application software of the portable terminal, and is displayed on a part of or the whole of the touchscreen 140.

When the information processing device 100 is a digital camera, the imaging section 110 is a portion that includes a lens, an image sensor, and the like of the digital camera. The touchscreen 140 is a touchscreen provided on the digital camera. In a typical digital camera, a plane on which the imaging section 110 is disposed is opposite to a plane on which the touchscreen 140 is disposed. The operation screen 300 is a screen that is displayed by control software or the like of the digital camera, and is typically displayed on the entire touchscreen 140.

Figure 2:
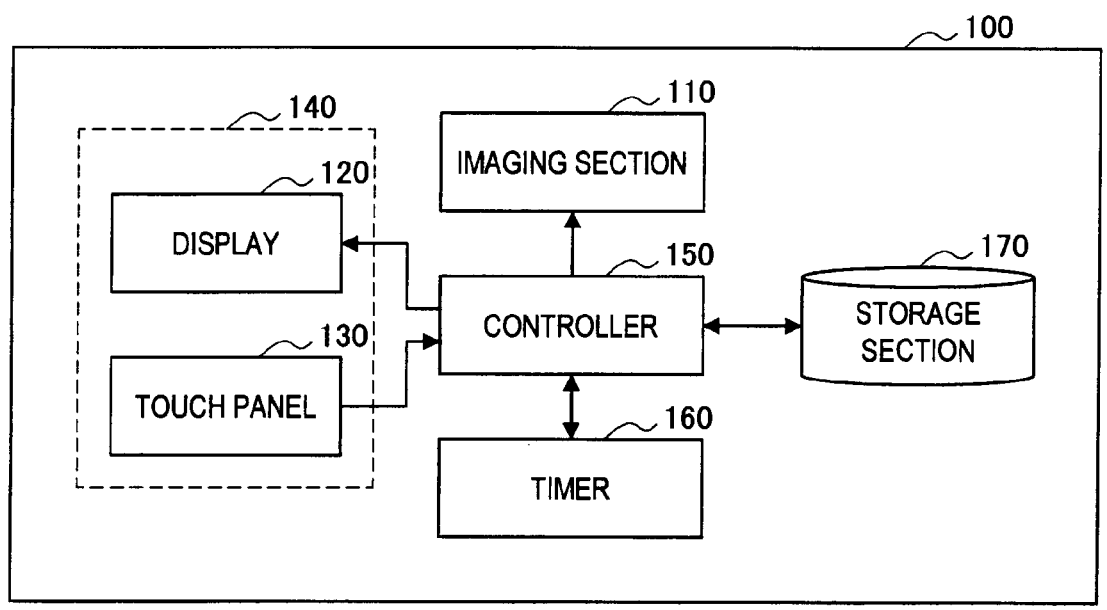
FIG. 2 is a block diagram showing the function and the configuration of the information processing device in accordance with the same embodiment.

FIG. 2 is a block diagram showing the function and the configuration of the information processing device 100 in accordance with the first embodiment of the present disclosure. Referring to FIG. 2, the information processing device 100 includes the imaging section 110; the touchscreen 140 including a display 120 and a touch panel 130; a controller 150; a timer 160; and a storage section 170.

The imaging section 110 captures a still image or a moving image of an object. The imaging section 110 includes a lens, an image sensor, and the like, and further includes an actuator, a motor drive, a signal processing circuit, and the like as needed. As described above, the imaging section 110 can be either built in the information processing device 100 or be externally attached to the information processing device 100 via a USB or the like.

The display 120 is a display section on which the operation screen 300 including the shutter button 310 for controlling the imaging section 110 is displayed. The display 120 can be, for example, a LCD (Liquid Crystal Display), a PDP (Plasma Display Panel), or an organic EL (Electro-Luminescence) panel. Content displayed on the display 120, which includes the operation screen 300, is controlled by the controller 150.

The touch panel 130 is an operation section for acquiring an operation of a user on the shutter button 310 displayed on the display 120. The touch panel 130 acquires a drag operation in the horizontal direction of the screen, which is a first operation performed on the shutter button 310, and a pressing operation, which is a second operation performed on the shutter button 310. The pressing operation herein refers to an operation of tapping the shutter button 310 on the touch panel 130. Instead of using the touch panel 130, it is also possible to use a pointing device such as a mouse or a tablet, which can acquire the aforementioned two types of operations, as the operation section. The pressing operation performed when the operation section is a mouse is an operation of clicking the shutter button 310 displayed on the display 120.

The controller 150 controls each section of the information processing device 100. The function of the controller 150 can be either implemented with a circuit configuration including an integrated circuit, for example, or by execution of a program, which is stored in the storage section 170, with a CPU (Central Processing Unit).

Herein, the controller 150, when the touch panel 130 has acquired a drag operation on the shutter button 310, sets the counter value of the timer 160 in accordance with the distance of the movement of the shutter button 310 caused by the drag operation. For example, the controller 150 can determine the counter value of the timer 160 from the moving distance using a linear function. Alternatively, the controller 150 can determine the counter value of the timer 160 from the moving distance using a nonlinear function such as a logarithmic function.

In addition, the controller 150 changes the display of the shutter button 310 on the operation screen 300, which is displayed on the display 120, with the progress of the countdown of the timer 160. Specifically, the controller 150 changes the display position of the shutter button 310 in a direction opposite to the direction of the drag operation. Thus, the display position of the shutter button 310 changes such that its movement caused by the drag operation is gradually pulled back with the progress of the countdown of the timer 160.

Further, the controller 150, when the touch panel 130 has acquired a pressing operation on the shutter button 310 or when the timer 160 has expired, causes the imaging section 110 to execute imaging of the object. That is, the controller 150 causes the imaging section 110 to execute imaging of the object with an instruction of the user to execute an imaging process or the expiration of the timer 160 as a trigger.

The timer 160 is a countdown timer with a counter. The counter value of the timer 160 is set by the controller 150 in accordance with the distance of the movement of the shutter button 310 caused by a drag operation on the shutter button 310. After the counter value is set, the timer 160 starts countdown of the counter value. As the counter value is counted down by a predetermined amount, the controller 150 changes the display of the shutter button 310 on the display 120. When the timer 160 has expired, the controller 150 causes the imaging section 110 to execute imaging of the object.

The storage section 170 stores data that is necessary to perform a process in the information processing device 100. For example, the storage section 170 stores digital data obtained through an imaging process with the imaging section 110. Further, the storage section 170 can store a program that implements the function of the controller 150 upon being executed by a CPU. The storage section 170 is implemented by combining as appropriate a storage device such as ROM (Read Only Memory) or RAM (Random Access Memory) and a removable storage medium such as an optical disc, a magnetic disk, or semiconductor memory. Thus, the aforementioned program can be either a program that is downloaded from a network (not shown) and is then stored in the storage device or a program that has been stored in the removable storage medium in advance.

(1-2. Operation on Operation Screen)
(Operation Screen at Initial State)

Figure 3:
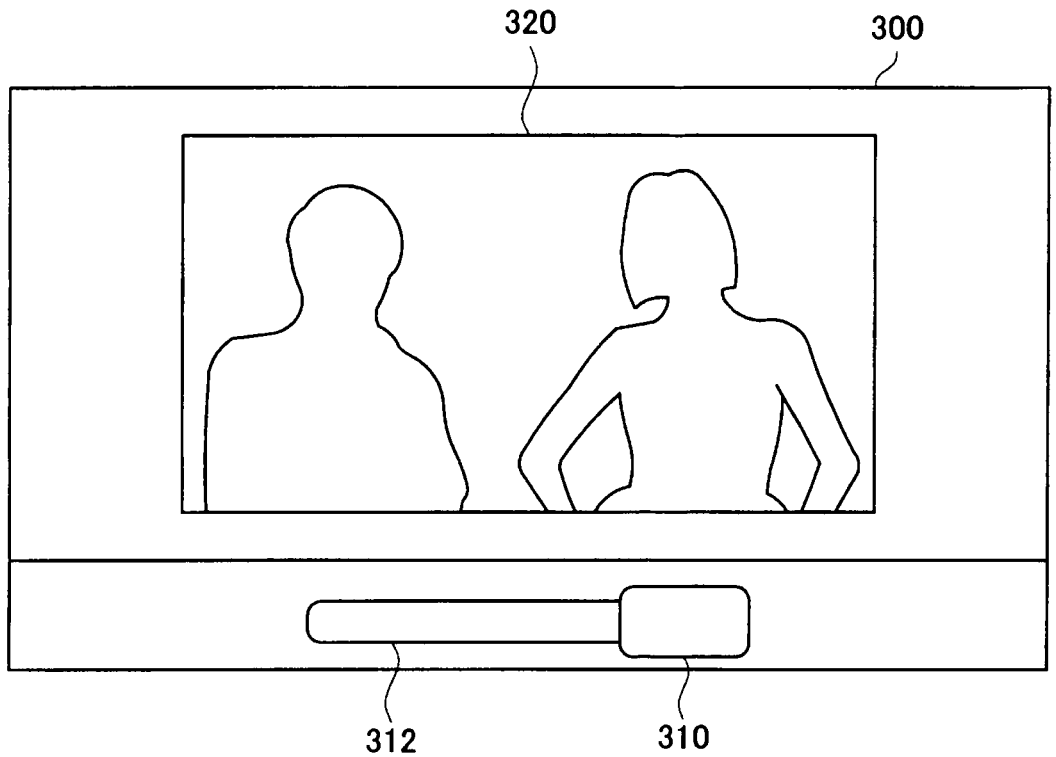
FIG. 3 is a diagram showing an example of an operation screen at the initial state in accordance with the same embodiment.

FIG. 3 is a diagram showing an example of the operation screen 300 at the initial state in accordance with the first embodiment of the present disclosure. Referring to FIG. 3, the operation screen 300 displays the shutter button 310, a timer-settable time display 312, and the target image 320.

The following description of the operation on the operation screen is based on the presumption that a user operates the shutter button 310 by performing a drag operation and a pressing operation thereon via the touch panel 130. However, even when the operation section of the information processing device 100 is a pointing device such as a mouse or a tablet, the shutter button 310 can be similarly operated through a drag operation and a pressing operation.

The operation screen 300 is displayed on the display 120 by the controller 150 to control the imaging section 110 of the information processing device 100. The operation screen 300 can be displayed on either a part of or the whole of the display 120. In addition, the size of the operation screen 300 can be adjustable on the display 120.

The shutter button 310 is an icon for controlling the imaging section 110. A user can perform a drag operation and a pressing operation on the shutter button 310 via the touch panel 130. Although the shutter button 310 is shown as being approximately rectangular in shape, the shutter button 310 can have any shape. Further, the shutter button 310 can be displayed three-dimensionally in order to show that it is a button.

The timer-settable time display 312 is displayed as a region where the shutter button 310 can be dragged. In the example shown in the drawing, the timer-settable time display 312 is displayed on the left side of the shutter button 310 on the screen. This shows that the shutter button 310 can be dragged to the left on the screen and that the timer can be set to the time, which is indicated by the timer-settable time display 312, at the maximum.

The target image 320 is an image to be shot by the imaging section 110. The target image 320 is an image that is captured by the imaging section 110 at that point in time, and the user can adjust the direction of the imaging section 110 and the timing of the imaging process on the basis of the target image 320.

Herein, when the user has performed a drag operation on the shutter button 310 via the touch panel 130, the controller 150 moves the shutter button 310 in accordance with the drag operation, and sets the timer 160 in accordance with the moving distance. In addition, when the user has performed a pressing operation on the shutter button 310 via the touch panel 130, the controller 150 causes the imaging section 110 to execute imaging of the object. That is, when the user wants to set the timer 160, he drags the shutter button 310, whereas when the user wants to immediately start an imaging process, he presses the shutter button 310.

As described above, two types of operations, which include setting of a timer for the remaining time until the start of an imaging process and execution of the imaging process, can be performed through two types of operations, which include a drag operation and a pressing operation, on the shutter button 310 that is an icon. Accordingly, the user can easily and selectively use an imaging process with the timer 160 and a normal imaging process without being aware of the differences of the two operations.

(Operation Screen when Time is Set)

Figure 4:
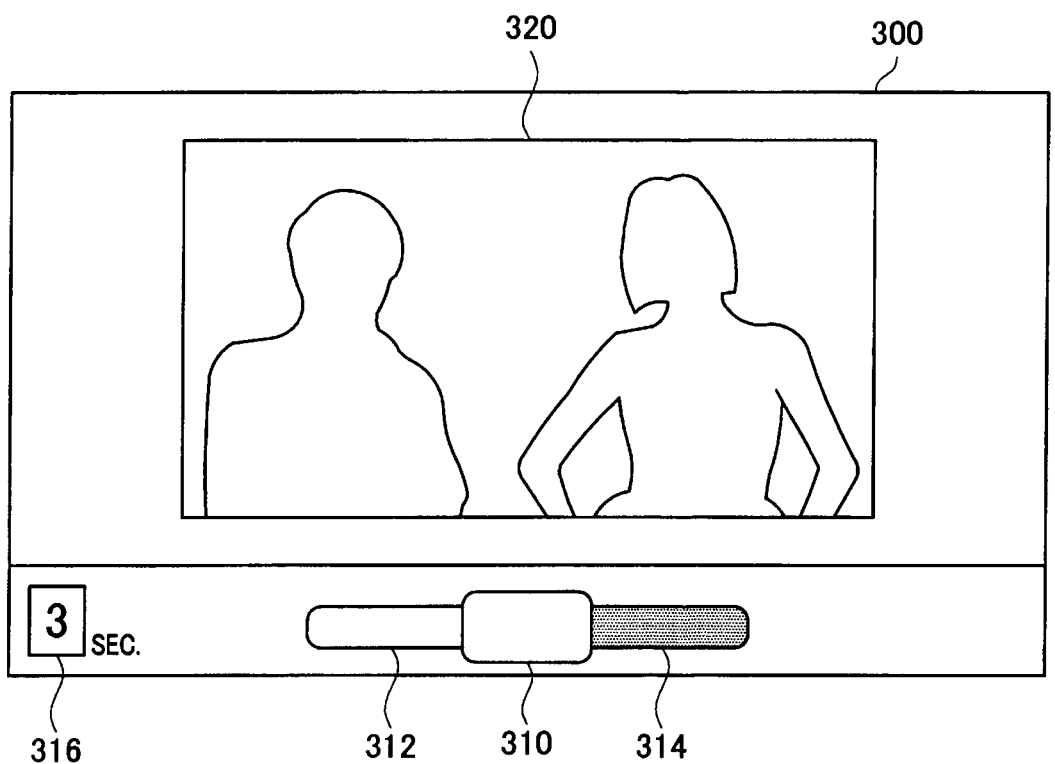
FIG. 4 is a diagram showing an example of the operation screen when a timer is set in accordance with the same embodiment.

FIG. 4 is a diagram showing an example of the operation screen 300 when a timer is set in accordance with the first embodiment of the present disclosure. Referring to FIG. 4, the operation screen 300 displays a timer's remaining time display 314 and a timer's remaining time auxiliary display 316 in addition to the shutter button 310, the timer-settable time display 312, and the target image 320.

Herein, the shutter button 310 is, in response to a drag operation of a user via the touch panel 130, displayed as having moved to the left on the screen. The controller 150 of the information processing device 100 sets the counter value of the timer 160 in accordance with the moving distance at this time. As the counter value of the timer 160 is counted down by a predetermined amount, the shutter button 310 is displayed as having moved in a direction opposite to the direction of the drag operation. Specifically, the shutter button 310 moves such that its movement caused by the drag operation is gradually pulled back with the progress of the countdown of the timer 160. When the shutter button 310 has reached its initial display position, the imaging section 110 executes an imaging process.

As described above, as the counter value of the timer 160 is set in accordance with the distance of the movement of the shutter button 310 caused by a drag operation, the user can intuitively set the timer 160 through an operation with analog visual effects. Accordingly, the user can intuitively understand that the countdown of the timer 160 is in progress.

The timer's remaining time display 314 is displayed as a path of the movement of the shutter button 310 caused by a drag operation. That is, the timer's remaining time display 314 indicates a path that starts at the position of the shutter button 310 on the operation screen 300 at the initial state shown in FIG. 3 and ends at the position of the shutter button 310 on the screen 300 when the timer is set as shown in FIG. 4. The timer's remaining time display 314 can be displayed in a different color from the shutter button 310 and the timer-settable time display 312 so that the timer's remaining time display 314 can be easily discerned. In addition, the display of the timer's remaining time display 314 can be changed as the shutter button 310 moves with the progress of the countdown of the timer 160.

As the timer's remaining time display 314 is displayed as described above, the user can intuitively understand the counter value of the timer 160, that is, the remaining time until the imaging section 110 starts an imaging process, as a path of the drag operation of the user.

The timer's remaining time auxiliary display 316 is displayed by quantifying the counter value of the timer 160. The timer's remaining time auxiliary display 316 can be displayed with the timer's remaining time display 314 on the operation screen 300 so that the fact that the timer is set and the remaining time until the start of an imaging process is presented to the user with redundancy.

On the aforementioned operation screen 300 on which the timer is operated, if the user performs a drag operation on the shutter button 310 via the touch panel 130, the controller 150 will move the shutter button 310 in accordance with the drag operation, and reset the timer 160 in accordance with the moving distance. Meanwhile, if the user performs a pressing operation on the shutter button 310 via the touch panel 130, the controller 150 will cause the imaging section 110 to execute imaging of the object. That is, when the user wants to reset the timer 160, he drags the shutter button 310, whereas when the user wants to immediately start an imaging process, he presses the shutter button 310.

As described above, even when a timer is set, it is still possible to perform a drag operation and a pressing operation on the shutter button 310, and thus perform two kinds of operations including a reset of the timer for counting the remaining time until the start of an imaging process and execution of the imaging process. Accordingly, the user can easily reset the timer through an intuitive operation when he feels that the initial timer setting is too long or too short, without the need to perform an operation to cancel the timer. Further, the user can, even when he changes his mind while setting the timer and feels like imaging the object immediately, easily execute an imaging process through an intuitive operation without the need to perform an operation to cancel the timer.

In the example described above with reference to FIGS. 3 and 4, the shutter button 310 is initially displayed at a position corresponding to a counter value of zero of the timer. However, the counter value can be initially set to, for example, two seconds or five seconds. In such a case also, the operation screen 300 at the initial state can display the timer's remaining time display 314 and the timer's remaining time auxiliary display 316.

(2. Second Embodiment)

Next, the second embodiment of the present disclosure will be described with reference to FIG. 5. The second embodiment of the present disclosure differs from the first embodiment in the functions of the controller 150 and the timer 160 and in the operation screen 300 displayed when the timer is set. However, other functions and configurations are approximately the same as those of the first embodiment. Thus, detailed description thereof is omitted herein.

Figure 5:
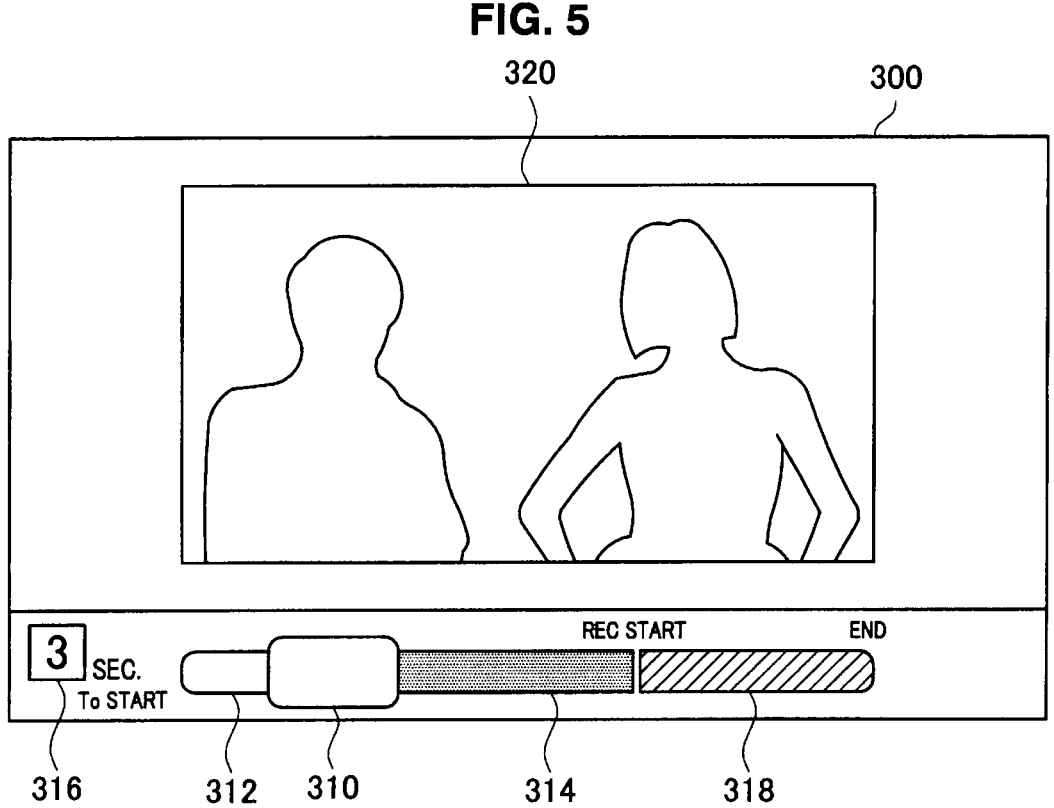
FIG. 5 is a diagram showing an example of an operation screen when a timer is set in accordance with the second embodiment of the present disclosure.

FIG. 5 is a diagram showing an example of the operation screen 300 when the timer is set in accordance with the second embodiment of the present disclosure. Referring to FIG. 5, the operation screen 300 displays an imaging duration display 318 in addition to the shutter button 310, the timer-settable time display 312, the timer's remaining time display 314, the timer's remaining time auxiliary display 316, and the target image 320.

In this embodiment, the imaging section 110 captures a moving image of an object. The controller 150 sets two types of timers, which include a timer for counting the remaining time until the start of capturing a moving image and a timer indicating the duration time of the capturing, in accordance with the distance of the movement of the shutter button 310 caused by drag operations on the shutter button 310 and acquired by the touch panel 130. Setting of the two types of timers can be realized by providing the timer 160 with two counters. Alternatively, setting of the two types of timers can be realized such that the controller 150 first sets the timer 160 to a counter value indicative of the remaining time until the start of capturing a moving image, and sets the timer 160 to, when the timer 160 has expired and the imaging process has started, a counter value indicative of the duration time of the capturing.

On the operation screen 300, the aforementioned two types of timers can also be set by performing two stages of drag operations on the shutter button 310, for example. In that case, the user sets the duration of an imaging process by performing a first-stage drag operation, and then sets the remaining time until the start of the imaging process by performing a second-stage drag operation. Such two-stage drag operations can be identified when a user's finger has once lifted off the touch panel 130 or when the user's finger has once stopped on the touch panel 130.

As described above, as the two types of timers are set in accordance with the distance of the movement of the shutter button 310 caused by drag operations, the user can also intuitively set the duration of an imaging process of a moving image through an operation with analog visual effects.

Herein, the imaging duration display 318 is displayed as a path of the movement of the shutter button 310 caused by a first-stage drag operation, and the timer's remaining time display 314 is displayed as a path of the movement of the shutter button 310 caused by a second-stage drag operation. The imaging duration display 318 can be displayed in a different color from the timer-settable time display 312 and the timer's remaining time display 314 so that the imaging duration display 318 can be easily discerned. In addition, a separator line as shown can be displayed between the timer's remaining time display 314 and the imaging duration display 318, and characters like "REC START" can also be displayed so that the user can easily perceive the time indicated by each display. In addition, the display of the imaging duration display 318 can be changed with the movement of the shutter button 310 in accordance with the progress of the countdown of the timer 160.

As described above, displaying the imaging duration display 318 also allows the user to intuitively perceive the duration of an imaging process of a moving image, as a path of the drag operation.

(3. Third Embodiment)

Next, the third embodiment of the present disclosure will be described with reference to FIGS. 6 to 8. The third embodiment of the present disclosure differs from the first and second embodiments in the function of the controller 150 and the display of the operation screen 300. However, other functions and configurations are approximately the same as those of the first and second embodiments. Thus, detailed description thereof is omitted herein.

(3-1. Operation on Operation Screen)

Figure 6:
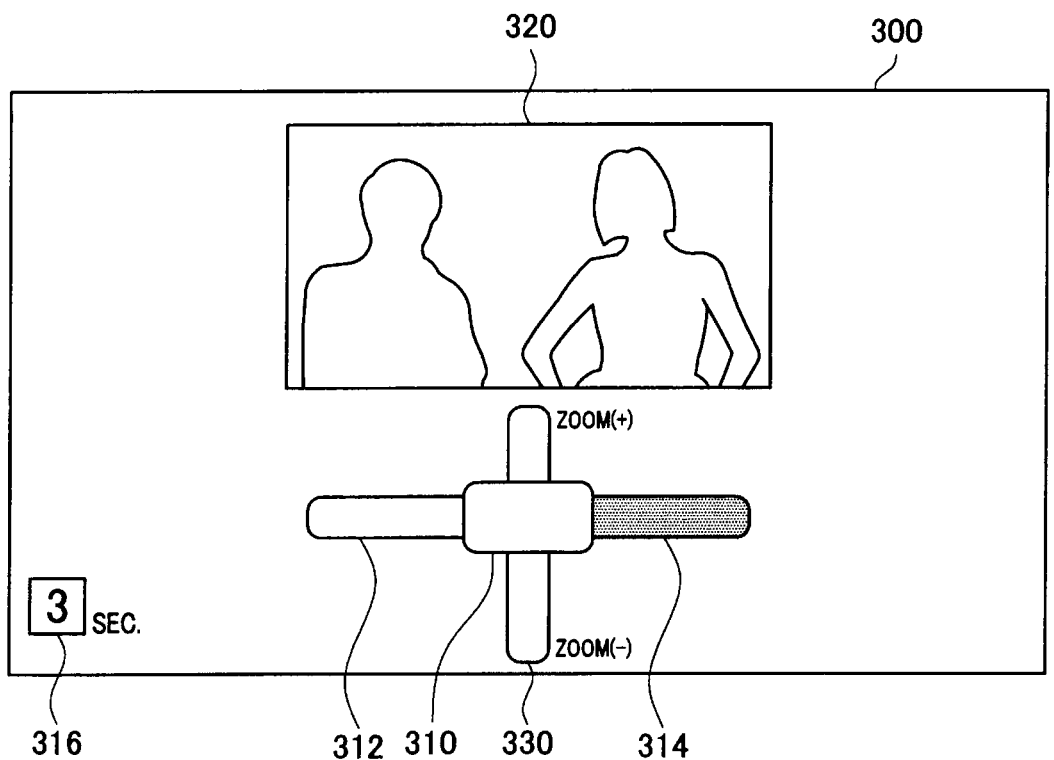
FIG. 6 is a diagram showing an example of an operation screen before a parameter is set in accordance with the third embodiment of the present disclosure.

FIG. 6 is a diagram showing an example of the operation screen 300 before a parameter is set in accordance with the third embodiment of the present disclosure. Referring to FIG. 6, the operation screen 300 displays an angle-of-view setting display 330 in addition to the shutter button 310, the timer-settable time display 312, the timer's remaining time display 314, the timer's remaining time auxiliary display 316, and the target image 320.

Herein, a user can perform a drag operation in the vertical direction of the screen, which is a third operation, via the touch panel 130, in addition to a drag operation in the horizontal direction of the screen, which is the first operation on the shutter button 310, and a pressing operation, which is the second operation on the shutter button 310. The controller 150 changes the angle of view, which is a parameter set for the imaging section 110, in accordance with the distance of the movement of the shutter button 310 caused by a drag operation in the vertical direction of the screen. Note that the parameter to be changed can also be, for example, luminance, white balance, or the duration of an imaging process of a moving image.

As described above, as a drag operation on the shutter button 310, which is an icon, in the vertical direction of the screen allows a change in the parameter set for the imaging section, the user can freely adjust the angle of view, luminance, white balance, the duration of an imaging process of a moving image, or the like through an intuitive operation when the timer is set or while the timer is set.

The angle-of-view setting display 330 is displayed as a region where the shutter button 310 can be dragged in the vertical direction of the screen. In the example shown in the drawing, the angle-of-view setting display 330 is displayed on the vertically opposite sides of the shutter button 310. This shows that the shutter button 310 can be dragged either in the upward direction or the downward direction of the screen, and that the angle of view set for the imaging section 110 is changed by a drag operation in the vertical direction of the screen. The angle-of-view setting display 330 can also be accompanied by a character string that displays a parameter to be changed. The example herein shows that a parameter for the angle of view set for the imaging section 110 is changed on the basis of a character string that indicates that dragging the shutter button 310 in the upward direction of the screen will zoom in the image, and dragging the shutter button 310 in the downward direction will zoom out the image.

As the angle-of-view setting display 330 is displayed as described above, the user can easily understand that a parameter for the angle of view can be set by performing a drag operation on the shutter button 310 in the vertical direction of the screen, and can also easily understand the relationship between the direction of the drag and an increase/decrease in the parameter for the angle of view.

(Operation Screen After Parameter is Set)

Figure 7:
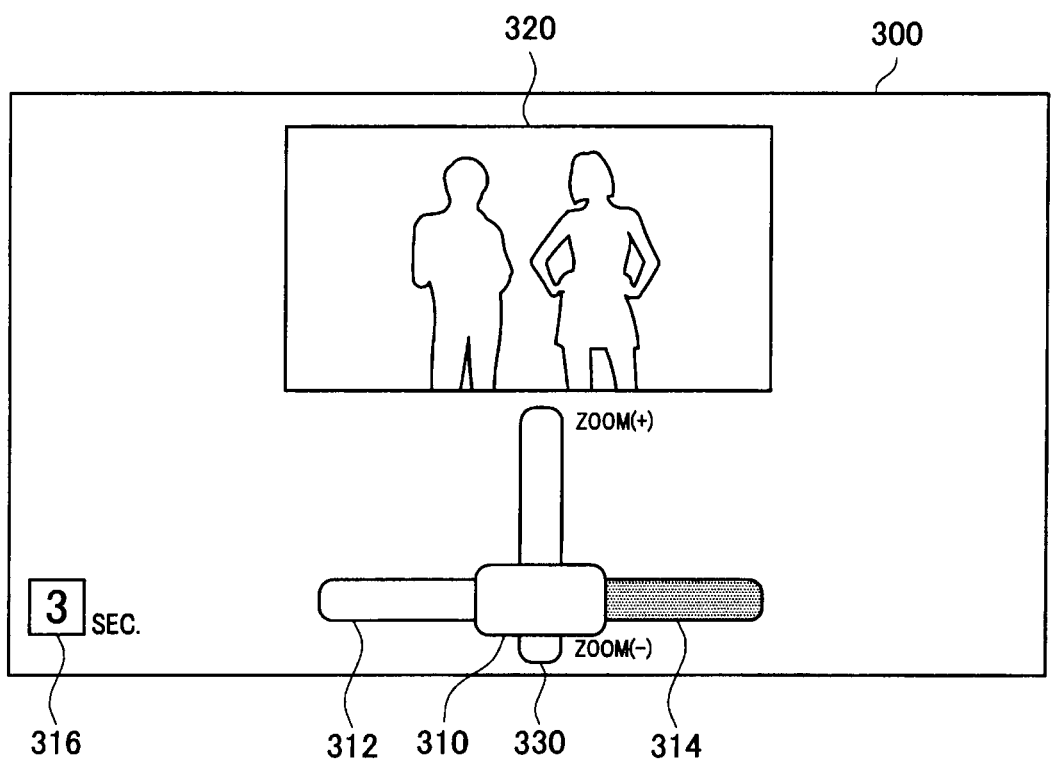
FIG. 7 is a diagram showing an example of the operation screen after a parameter is set in accordance with the same embodiment.

FIG. 7 is a diagram showing an example of the operation screen 300 after a parameter is set in accordance with the third embodiment of the present disclosure. Referring to FIG. 7, the operation screen 300 displays the shutter button 310, the timer-settable time display 312, the timer's remaining time display 314, the timer's remaining time auxiliary display 316, the target image 320, and the angle-of-view setting display 330.

In the example shown in the drawing, the controller 150 moves the shutter button 310 in the vertical direction of the screen in accordance with the value of a parameter set for the imaging section 110. Specifically, when a drag operation in the downward direction is performed on the shutter button 310, a parameter for the angle of view set for the imaging section 110 is changed. Thus, the controller 150 moves the position of the shutter button 310 downward in accordance with the changed parameter for the angle of view. Herein, as the shutter button 310 is displayed such that it moves in the downward direction of the screen, the timer-settable time display 312 and the timer's remaining time display 314 can also be displayed such that they move in the downward direction of the screen.

As described above, as the shutter button 310 moves in accordance with a parameter set for the imaging section 110, the user can intuitively perceive the value of the parameter set for the imaging section 110 and can easily determine whether to reset the parameter, for example.

On the operation screen 300 on which the parameter has been set as described above, if the user performs a drag operation on the shutter button 310 in the vertical direction of the screen via the touch panel 130, the controller 150 will move the shutter button 310 in accordance with the drag operation, and changes the parameter set for the imaging section 110 again in accordance with the moving distance. It is also possible to perform, even on the operation screen 300 with the changed parameter, operations of setting a timer, executing an imaging process, and changing the parameter by performing three types of operations on the shutter button 310.

As described above, even after a parameter is set, a drag operation in the vertical direction of the screen can be performed on the shutter button 310. Further, as a reset of the parameter is possible, the user can easily reset the parameter if he feels that the initial setting of the parameter is not suitable.

(3-2. Process Flow)

Figure 8:
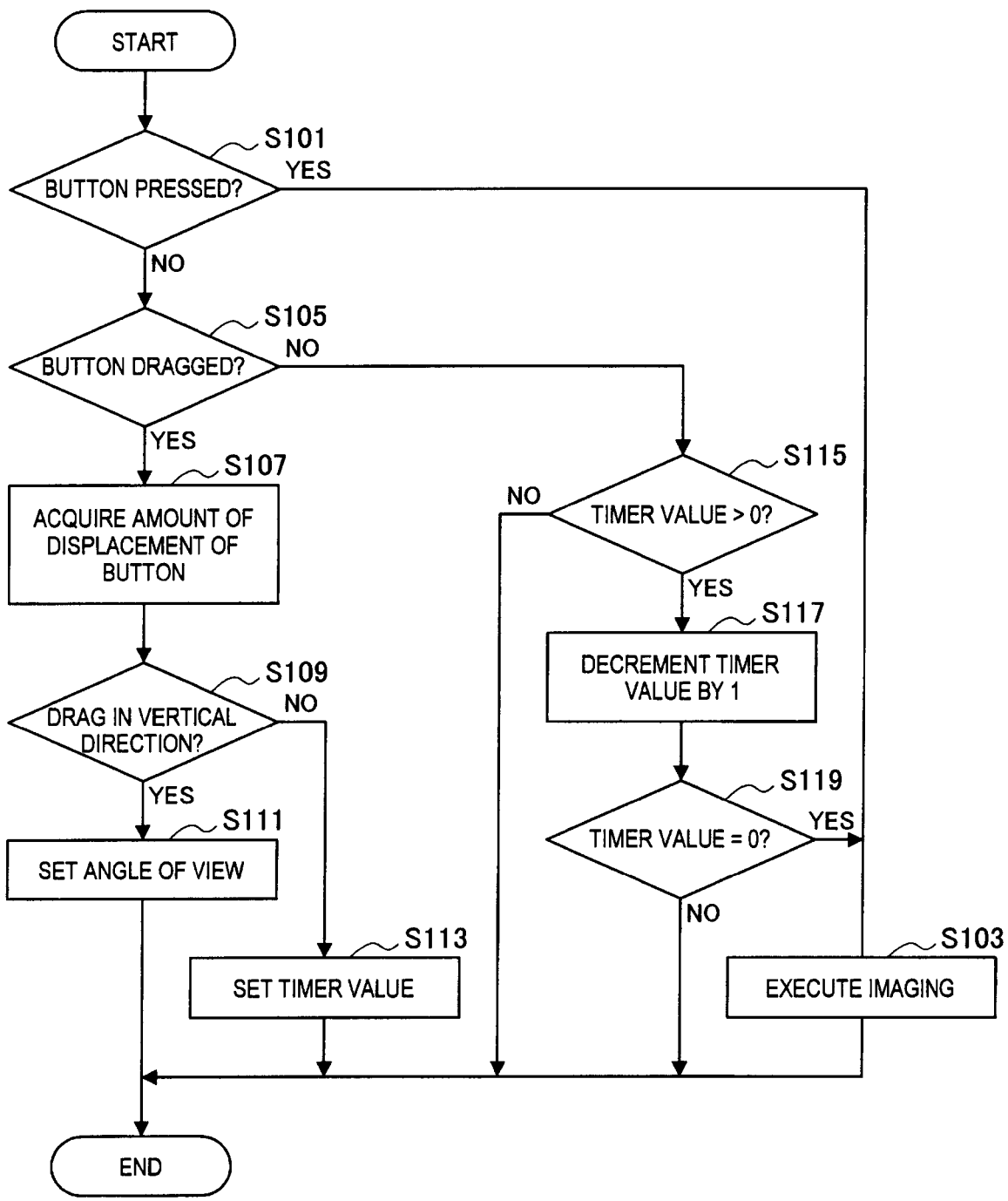
FIG. 8 is a flowchart showing an example of a process in accordance with the same embodiment.

FIG. 8 is a flowchart showing an example of a process in accordance with the third embodiment of the present disclosure. Referring to FIG. 8, a process that is executed by the information processing device 100 every predetermined cycle is shown.

Note that the steps described in the following flowchart include not only processes that are performed chronologically in accordance with the order described in the flowchart but also processes that are executed in parallel or individually. In addition, even the order of the steps that are processed chronologically can be changed as appropriate.

First, the controller 150 determines if the touch panel 130 has acquired a pressing operation on the shutter button 310 (S101). If a pressing operation is determined to have been acquired, the controller 150 causes the imaging section 110 to execute an imaging process (step S103), and then terminates the process. Meanwhile, if a pressing operation is not determined to have been acquired, the controller 150 next determines if the touch panel 130 has acquired a drag operation on the shutter button 310 (step S105).

If a drag operation is determined to have been acquired in step S105, the controller 150 next acquires the amount of the displacement of the shutter button 310 (step S107). Next, the controller 150 determines if the acquired drag operation is a drag operation in the vertical direction of the screen (step S109).

If the drag operation is determined to be a drag operation in the vertical direction of the screen in step S109, the controller 150 next changes and resets a parameter for the angle of view that is set for the imaging section 110 in accordance with the amount of the displacement of the shutter button 310 acquired in step S107 (step S111), and then terminates the process. Meanwhile, if the drag operation is not determined to be a drag operation in the vertical direction of the screen, that is, if the drag operation is determined to be a drag operation in another direction, which is the horizontal direction, of the screen, the controller 150 sets the counter value of the timer 160 in accordance with the amount of the displacement of the shutter button 310 acquired in step S107 (S113), and then terminates the process.

Meanwhile, if a drag operation is not determined to have been acquired in step S105, the controller 150 determines that there has been no operation performed on the shutter button 130 via the touch panel 130, and proceeds to a process of using the timer 160. Herein, the controller 150 first determines if the counter value of the timer 160 is greater than zero (step S115).

If the counter value of the timer 160 is determined to be grater than zero in step S115, the controller 150 determines that the timer for counting the remaining time until the start of an imaging process is set, and counts down the counter value of the timer 160 by a predetermined amount (step S117). The predetermined amount herein is one. After the countdown of the counter value of the timer 160 in step S117, the controller 150 determines if the counter value of the timer 160 has become zero (step S119).

If the counter value of the timer 160 is determined to be zero in step S119, the controller 150 determines that the timer 160 has expired, and causes the imaging section 110 to execute an imaging process (S103), and then terminates the process. Meanwhile, if the counter value of the timer 160 is not determined to be zero, the controller 150 terminates the process.

Meanwhile, if the counter value of the timer 160 is not determined to be greater than zero, that is, if the counter value of the timer 160 is determined to be zero in step S115, the controller 150 determines that the timer for counting the remaining time until the start of an imaging process is not set, and thus terminates the process.

(3-3. Variation)

As a variation of this embodiment, the following configuration can be provided: the controller 150 moves the shutter button 310 in the vertical direction of the screen in accordance with the value of a parameter set for the imaging section 110, and then returns the shutter button 310 to the initial position, that is, to the center of the vertical direction of the angle-of-view setting display 330 on the screen. In such a case, the color of a part of the angle-of-view setting display 330 can be changed, for example, in accordance with the value of the parameter set for the imaging section 110 so that the user can perceive the value of the parameter. In addition, the controller 150 can, when a timer is set by a drag operation in the horizontal direction of the screen after the parameter is set, hide the angle-of-view setting display 330.

With the configuration in which the shutter button 310 is returned to the initial position as described above, it is possible to display a display element, which is related with the setting of the timer 160, at a fixed place, and thus prevent confusion and operation errors of the user. Further, it is also possible to provide a configuration in which, after the controller 150 has hidden the angle-of-view setting display 330, a settings display for another parameter such as luminance, white balance, or the duration of an imaging process of a moving image is displayed, and such parameter is changed by a drag operation in the vertical direction of the screen.

(4. Fourth Embodiment)

Next, the fourth embodiment of the present disclosure will be described with reference to FIGS. 9 and 10. Note that the fourth embodiment of the present disclosure differs from the third embodiment in the functions of a touch panel 230 and a controller 250 and in the display of an operation screen 400. However, as other functions and configurations are approximately the same as those of the third embodiment, detailed description thereof is omitted herein.

(4-1. Device Configuration)

Figure 9:
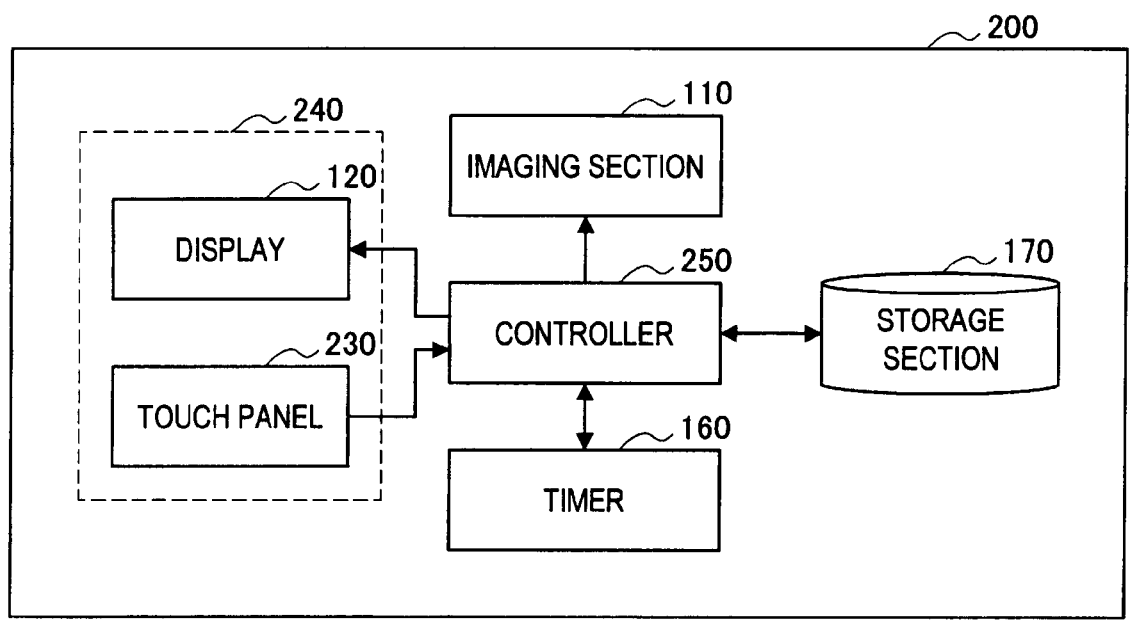
FIG. 9 is a block diagram showing the function and the configuration of an information processing device in accordance with the fourth embodiment of the present disclosure.

FIG. 9 is a block diagram showing the configuration of the information processing device 200 in accordance with the fourth embodiment of the present disclosure. Referring to FIG. 9, the information processing device 200 includes an imaging section 110; a touchscreen 240 including a display 120 and a touch panel 230; the controller 250; a timer 160; and a storage section 170.

The information processing device 200 can be a variety of devices such as a PC, a portable terminal, a digital camera, or a television as with the information processing device 100 in accordance with the third embodiment.

The touch panel 230 is an operation section for acquiring an operation of a user on a shutter button 410 displayed on the display 120. The touch panel 230 can acquire the magnitude of pressing force of a pressing operation of the user on the shutter button 410. The touch panel 230 acquires a pressing operation (a first operation on the shutter button 410) with pressing force whose magnitude is greater than or equal to a predetermined value, a pressing operation (a second operation) with pressing force whose magnitude is less than the predetermined value, a drag operation (a third operation) in the vertical direction of the screen, and a drag operation (a fourth operation) in the horizontal direction of the screen. The touch panel 230 can be replaced with a pointing device such as a tablet that can acquire the magnitude of pressing force.

The controller 250 controls each section of the information processing device 100. The controller 250 can be either implemented with hardware using a circuit configuration including an integrated circuit, for example, or be implemented with software using a CPU (Central Processing Unit) that executes a program stored in the storage section 170.

Herein, the controller 250 can, when the touch panel 230 has acquired a pressing operation with pressing force whose magnitude is greater than or equal to a predetermined value on the shutter button 410, sets the counter value of the timer 160 in accordance with the magnitude of the pressing force applied in the pressing operation. For example, the controller 250 can determine the counter value of the timer 160 from the magnitude of the pressing force using a linear function. Alternatively, the controller 250 can determine the counter value of the timer 160 from the magnitude of the pressing force using a nonlinear function such as a logarithmic function.

In addition, the controller 250 reduces the display size of the shutter button 410 to less than the initial display size, in accordance with the set counter value of the timer 160. Further, the controller 250 gradually increases the display size of the shutter button 410 up to the initial display size with the progress of the countdown of the timer 160.

Meanwhile, the controller 250, when the touch panel 230 has acquired a pressing operation with pressing force whose magnitude is less than the predetermined value on the shutter button 410 or when the timer 160 has expired, causes the imaging section 110 to execute imaging of the object. That is, the controller 250 causes the imaging section 110 to execute an imaging process with an instruction of the user to execute an imaging process or the expiration of the timer 160 as a trigger.

Further, the controller 250 changes a parameter for the angle of view, which has been set for the imaging section 110, in accordance with the distance of the movement of the shutter button 410 caused by a drag operation performed on the shutter button 410 in the vertical direction of the screen and acquired by the touch panel 230.

Furthermore, the controller 250 changes a parameter for luminance, which has been set for the imaging section 110, in accordance with the distance of the movement of the shutter button 410 caused by a drag operation performed on the shutter button 410 in the horizontal direction of the screen and acquired by the touch panel 230.

Note that the parameter, which is changed by the controller 250 in accordance with a drag operation performed on the shutter button 410 in the vertical direction or the horizontal direction of the screen, can be selected from among any of the angle of view, luminance, white balance, the duration of an imaging process of a moving image, and the like.

(4-2. Operation on Operation Screen)

Figure 10:
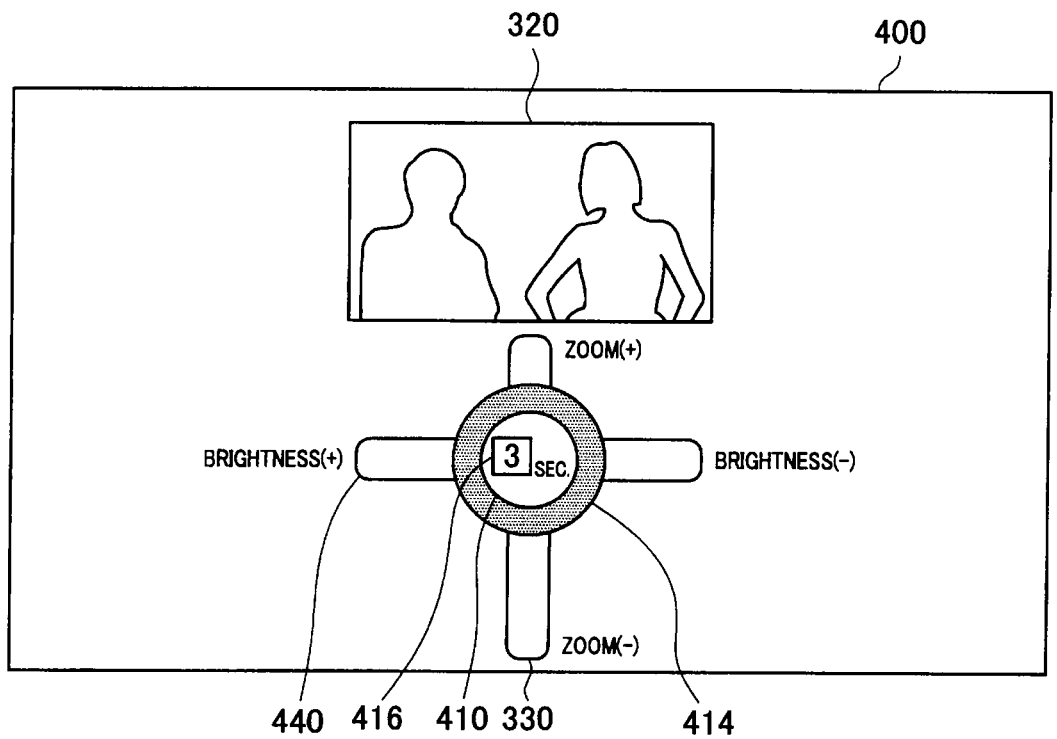
FIG. 10 is a diagram showing an example of an operation screen in accordance with the same embodiment.

FIG. 10 is a diagram showing an example of the operation screen 400 in accordance with the fourth embodiment of the present disclosure. Referring to FIG. 10, the operation screen 400 displays the shutter button 410, a timer's remaining time display 414, a timer's remaining time auxiliary display 416, the target image 320, the angle-of-view setting display 330, and a luminance setting display 440.

The shutter button 410 is an icon for controlling the imaging section 110. A user can perform a pressing operation, a drag operation in the vertical direction of the screen, and a drag operation in the horizontal direction of the screen on the shutter button 410 via the touch panel 230. Although the shutter button 410 is shown as being approximately circular in shape, the shutter button 410 can have any shape. Further, the shutter button 410 can be displayed three-dimensionally in order to show that it is a button.

Herein, when a user has performed a pressing operation with pressing force whose magnitude is greater than or equal to a predetermined value on the shutter button 410 via the touch panel 230, the controller 250 sets the timer 160 in accordance with the magnitude of the pressing force. Meanwhile, when the user has performed a pressing operation with pressing force whose magnitude is less than the predetermined value on the shutter button 410 via the touch panel 203, the controller 250 causes the imaging section 110 to execute imaging of the object. That is, when the user wants to set the timer, he strongly presses the shutter button 410, whereas when the user wants to immediately start an imaging process, he lightly presses the shutter button 410.

As described above, two types of operations, which include setting of a timer for counting the remaining time until the start of an imaging process and execution of the imaging process, can be performed through two types of pressing operations with strong pressing force and light pressing force on the shutter button 410 that is an icon. Accordingly, the user can easily and selectively use a timer-based imaging process and a normal imaging process without being aware of the differences of the two operations.

Herein, the shutter button 410 is displayed by being shrunk to less than the initial display size in accordance with the counter value of the timer 160 that is set in accordance with the magnitude of pressing force of the pressing operation of the user. After that, the shutter button 410 is gradually enlarged with the progress of the countdown of the timer 160. When the shutter button 410 has been enlarged to its initial display size, the imaging section 110 executes an imaging process.

As described above, as the counter value of the timer 160 is set in accordance with the magnitude of pressing force of a pressing operation on the shutter button 410 and the shutter button 410 is displayed by being shrunk in accordance with the set counter value, the user can intuitively set the timer 160 through an operation with analog visual effects. Further, as the shutter button 410 is enlarged with the progress of the countdown of the timer 160, the user can intuitively understand that the countdown of the timer 160 is in progress.

The timer's remaining time display 414 is displayed as the difference in the display size of the shutter button 410 before and after a pressing operation is performed. The timer's remaining time display 414 can be displayed in a different color from the shutter button 410 so that the timer's remaining time display 414 can be easily discerned. The display of the timer's remaining time display 414 can also change as the shutter button 410 is enlarged with the progress of the countdown of the timer 160.

As the timer's remaining time display 414 is displayed as described above, the user can intuitively perceive the counter value of the timer 160, namely, the remaining time until the imaging section 110 starts an imaging process, as a region that remains around the shutter button 410.

The timer's remaining time auxiliary display 416 is displayed by quantifying the counter value of the timer 160. The timer's remaining time auxiliary display 416 can be displayed with the timer's remaining time display 414 on the operation screen 300 so that the fact that the timer is set as well as the remaining time until the start of an imaging process is presented to the user with redundancy. When the shutter button 410 has a certain size, the timer's remaining time auxiliary display 416 can be displayed within the shutter button 410 as shown.

In addition, the user can perform a drag operation in the vertical direction of the screen, which is the third operation on the shutter button 410, and a drag operation in the horizontal direction of the screen, which is the fourth operation on the shutter button 410, via the touch panel 130. The controller 250 changes the angle of view, which is a first parameter set for the imaging section 110, in accordance with the distance of the movement of the shutter button 310 caused by the drag operation in the vertical direction of the screen. Further, the controller 150 changes the luminance, which is a second parameter set for the imaging section 110, in accordance with the distance of the movement of the shutter button 410 caused by the drag operation in the horizontal direction of the screen. The first and second parameters to be changed can be selected from among any of the angle of view, luminance, white balance, the duration of an imaging process of a moving image, and the like.

As described above, as a plurality of parameters set for the imaging section can be changed by performing drag operations on the shutter button 410, which is an icon, in the vertical direction and the horizontal direction of the screen, the user can freely adjust the angle of view, luminance, white balance, the duration of an imaging process of a moving image, and the like through intuitive operations when the timer is set or while the timer is set.

The luminance setting display 440 is displayed as a region where the shutter button 410 can be dragged in the horizontal direction of the screen. This shows that the shutter button 410 can be dragged to both the right and left on the screen and that the luminance set for the imaging section 110 is changed by a drag operation in the horizontal direction of the screen. The luminance setting display 440 can also be accompanied by a character string that displays the parameter to be changed as shown.

As the luminance setting display 440 is displayed as described above, the user can easily understand that the parameter for luminance can be set by performing a drag operation on the shutter button 410 in the horizontal direction of the screen, and can also easily understand the relationship between the direction of the drag and an increase/decrease in the parameter for luminance.

Further, the shutter button 410 can be displayed by being moved in the vertical direction or the horizontal direction of the screen in accordance with the value of a parameter set for the imaging section 110. In the example shown in the drawing, a parameter for the angle of view that is set for the imaging section 110 is changed as the shutter button 410 is dragged upward. Thus, the position of the shutter button 410 is displayed as having moved upward with the changed parameter for the angle of view. Herein, the luminance setting display 440 can be similarly displayed as having moved in the upward direction of the screen as the shutter button 410 is displayed as having moved in the upward direction of the screen.

(4-3. Variation)

As a variation of this embodiment, a pressing operation, which lasts for a duration that is greater than or equal to a predetermined time, can be acquired as the first operation on the shutter button 410, while a pressing operation, which lasts for a duration that is less than the predetermined time, can be acquired as the second operation on the shutter button 410. Further, the controller 250 can be configured to set the counter value of the timer 160 in accordance with the duration of the first operation.

As described above, using the duration of a pressing operation instead of using the magnitude of pressing force of the pressing operation allows the operation screen 400, which is similar to the operation screen of this embodiment, to be displayed even when the touch panel 230 is not capable of acquiring pressing force of a pressing operation of a user and when the touch panel 230 is replaced with a pointing device such as a mouse.

(5. Supplement)

Although the preferred embodiments of the present disclosure have been described in detail with reference to the appended drawings, the present disclosure is not limited thereto. It is obvious to those skilled in the art that various modifications or variations are possible insofar as they are within the technical scope of the appended claims or the equivalents thereof. It should be understood that such modifications or variations are also within the technical scope of the present disclosure.

The present disclosure contains subject matter related to that disclosed in Japanese Priority Patent Application JP 2010-155115 filed in the Japan Patent Office on Jul. 7, 2010, the entire content of which is hereby incorporated by reference.

What is claimed is:

1. An information processing device comprising:
   an imaging section configured to image an object;
   a display section configured to display at least an icon for controlling the imaging section;
   an operation section configured to acquire a first operation and a second operation on the icon; and
   a controller configured to, when the operation section has acquired the first operation, set a timer in accordance with an operation amount of the first operation and change a display of the icon on the display section in accordance with a progress of the timer, and configured to cause the imaging section to image the object when the operation section has acquired the second operation, and further configured to cause the imaging section to image the object when the timer has expired, wherein
   the icon is a button,
   the first operation is a first drag operation on the button,
   the second operation is a pressing operation on the button,
   the operation amount is a distance of a movement of the button on the display section caused by the first drag operation, and
   the controller changes a display position of the button on the display section along a direction of the first drag operation in accordance with the progress of the timer.

2. The information processing device according to claim 1, wherein the controller displays a remaining time of the timer on the display section as a path of the movement of the button on the display section caused by the first drag operation.

3. The information processing device according to claim 1, wherein
the imaging section captures a moving image of the object, and
the controller sets a timer for a remaining time until a start of capturing the moving image and a timer for a duration time of the capturing in accordance with the distance of the movement of the button on the display section caused by the first drag operation.

4. The information processing device according to claim 1, wherein
the operation section acquires a second drag operation on the button as a third operation, the second drag operation having a direction differing from that of the first drag operation, and
the controller changes a parameter set for the imaging section in accordance with a distance of a movement of the button on the display section caused by the second drag operation.

5. The information processing device according to claim 1, wherein a manipulation of the icon by performing the first operation thereupon initiates the controller to set the timer for initiating a delayed imaging of the object, and a manipulation of the icon by performing the second operation thereupon initiates the controller to trigger an immediate taking of the image of the object.

6. The information processing device according to claim 5, wherein the timer is set to a time value based on a distance the icon is moved during the manipulation in performing the first operation.

7. The information processing device according to claim 5, wherein the timer is set to a time value based on a pressure or a duration the icon is pressed during the manipulation in performing the first operation.

8. The information processing device according to claim 1, wherein the first operation and the second operation are performed on the icon by manipulating the icon through touching the display section by an operating object at a location on the display section at which the icon is displayed.

9. The information processing device according to claim 1, wherein in the first operation, the icon is dragged along a first sliding axis to initiate the timer, and a time value of the timer is set based upon the distance the icon is dragged from a starting location on the first sliding axis, and
wherein in the second operation, the icon is pressed, and in response, the imaging section is triggered to immediately take the image of the object.

10. The information processing device according to claim 9, wherein the icon is dragged by an operating object contacting a surface of the display section upon which the icon is displayed, and
wherein the timer is initiated when the operating object releases the icon by detaching contact from the surface, at a target location on the first sliding axis.

11. The information processing device according to claim 1, wherein the first operation and the second operation are different operations.

12. An information processing device comprising:
an imaging section configured to image an object;
a display section configured to display at least an icon for controlling the imaging section;
an operation section configured to acquire a first operation and a second operation on the icon; and
a controller configured to, when the operation section has acquired the first operation, set a timer in accordance with an operation amount of the first operation and change a display of the icon on the display section in accordance with a progress of the timer, and configured to cause the imaging section to image the object when the operation section has acquired the second operation, and further configured to cause the imaging section to image the object when the timer has expired, wherein
the icon is a button,
the first operation is a first pressing operation on the button with a pressing force whose magnitude is greater than or equal to a predetermined value,
the second operation is a second pressing operation on the button with a pressing force whose magnitude is less than the predetermined value,
the operation amount is the magnitude of the pressing force applied in the first pressing operation, and
the controller changes a size of the button on the display section in accordance with the progress of the timer.

13. The information processing device according to claim 12, wherein the controller displays on the display section a remaining time of the timer as a difference of the size of the button before and after the first pressing operation is acquired.

14. The information processing device according to claim 12, wherein
the operation section acquires a first drag operation on the button as a third operation, and
the controller changes a first parameter set for the imaging section in accordance with a distance of a movement of the button on the display section caused by the first drag operation.

15. The information processing device according to claim 14, wherein
the operation section acquires a second drag operation on the button as a fourth operation, the second drag operation having a direction differing from that of the first drag operation, and
the controller changes a second parameter set for the imaging section in accordance with a distance of a movement of the button on the display section caused by the second drag operation.

16. An information processing method comprising:
displaying an icon for controlling an imaging section, the imaging section being configured to image an object;
acquiring a first operation and a second operation on the icon; and
setting, when the first operation has been acquired, a timer in accordance with an operation amount of the first operation and changing a display of the icon in accordance with a progress of the timer, and causing, when the second operation has been acquired, the imaging section to image the object, and further causing, when the timer has expired, the imaging section to image the object, wherein
the icon is displayed as a button,
the first operation is a first drag operation on the button,
the second operation is a pressing operation on the button,
the operation amount is a distance of a movement of the displayed button caused by the first drag operation, and
a display position of the button is changed along a direction of the first drag operation in accordance with the progress of the timer.

17. A non-transitory computer-readable medium having embodied thereon a program, which when executed by a computer, causes the computer to perform a method, the method comprising:
displaying an icon for controlling an imaging section, the imaging section being configured to image an object;

acquiring a first operation and a second operation on the icon; and setting, when the first operation has been acquired, a timer in accordance with an operation amount of the first operation and changing a display of the icon in accordance with a progress of the timer, and causing, when the second operation has been acquired, the imaging section to image the object, and further causing, when the timer has expired, the imaging section to image the object, wherein the icon is displayed as a button, the first operation is a first drag operation on the button, the second operation is a pressing operation on the button, the operation amount is a distance of a movement of the displayed button caused by the first drag operation, and a display position of the button is changed along a direction of the first drag operation in accordance with the progress of the timer.

\* \* \* \* \*